C. THÄMER.
DEVICE FOR MEASURING THE AXIAL THRUST OF DRIVEN SHAFTS.
APPLICATION FILED AUG. 22, 1907.
920,218.
Patented May 4, 1909.
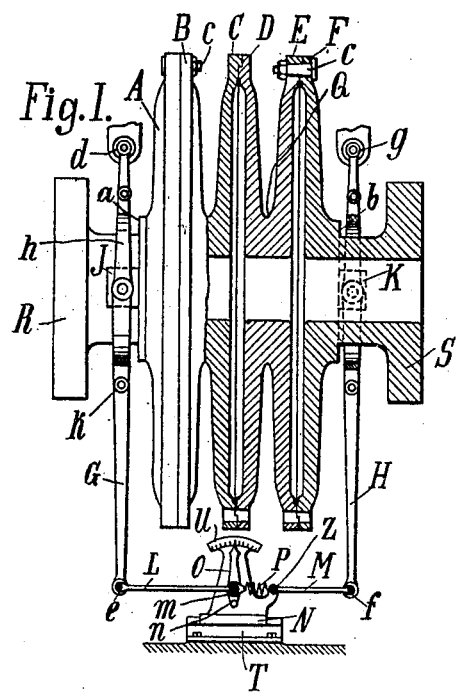
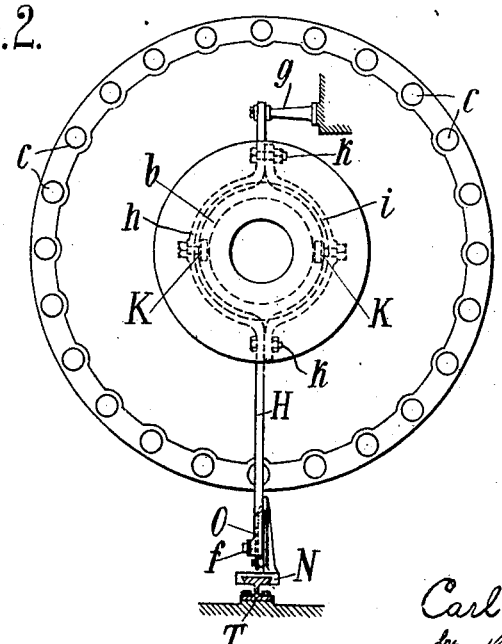
Witnesses.
Jesse N. Lutton.
Inventor.
Carl Thämer

UNITED STATES PATENT OFFICE.

CARL THÄMER, OF LANGFUHR, NEAR DANZIG, GERMANY.

DEVICE FOR MEASURING THE AXIAL THRUST OF DRIVEN SHAFTS.

No. 920,218. Specification of Letters Patent. Patented May 4, 1909.

Application filed August 22, 1907. Serial No. 389,701.

*To all whom it may concern:*

Be it known that I, CARL THÄMER, a subject of the King of Prussia, residing at 48 Hauptstrasse, Langfuhr, near Danzig, Germany, have invented certain new and useful Improvements in Devices for Measuring the Axial Thrust of Driven Shafts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to devices for measuring the axial thrust or pull of driven shafts, while they are being driven under their various conditions of use and the structure of which will herein after be more particularly described and claimed.

Referring to the drawings in which like parts are similarly designated, Figure 1, is a side view partially in section, and Fig. 2, is an end view of one form of the device.

The device consists essentially of one or more flexible sheet-like elements, preferably but not necessarily, constructed as dished disks, inserted in and connected to the line of shafting in which the thrust or pull is to be measured, by means of the axial distortion, *i. e.*, compression or extension, of the bellows-like structure so formed. Herein are shown a number of such dished disks A, B, C, D, E, and F, the number of which may be increased or diminished at will in accordance with the sensitiveness or size of the instrument.

In the drawing the dished disks B, C, and D, E, are made in one piece to form units, *i. e.*, they are formed in pairs, to avoid as far as possible the number of joints between the disks, but it is obvious that they may be made separate and joined together in pairs at or near their centers at Q. The disks or units are connected together at their outer rims by suitable bolts *c*.

The end disks A and F may be flexible or not as desired and have connected to or formed on them coupling flanges R and S by means of which the instrument is bolted or otherwise inserted in the shaft whose thrust or pull is to be measured so that the instrument will for the time being, form part of the shaft and rotate with it. The end plates A and F whether flexible or not, are provided near their centers with true bearing surfaces *a* and *b* against which are held blocks J and K of levers G and H respectively, so that by the extension and compression of the assembled disks, which form a bellows-like structure, these blocks and levers will be correspondingly moved.

On fixed pivots *d*, *g*, the levers G and H are mounted, said levers as shown in Fig. 2, are each provided with a loop intermediate their ends, the levers being bent to substantially semi-circular form at *h* to surround the boss between the flanges R, S and their adjacent end plates A and F. The loop is completed by a substantially semi-circular strap *i* bolted at *k* or otherwise secured to the rods G and H. Preferably, but not necessarily, at opposite points of the horizontal diameter of the loop are mounted the blocks J and K as shown.

T is a fixed guide way on which is slidable a slide N carrying scale U for the index hand O. The slide N is connected to the end *f* of the lever H by a link M. The other lever is pivotally connected at its end at *e* to a link L whose other end is pivoted at *m* to the index hand O. The point where the link L is connected to the index hand is distanced from the pivot point of said hand and is shown in Fig. 1 above the pivot point of said hand, which is at *n*. A coil or other suitable spring P connects the ends of links L and M, and tends to draw the two levers G and H together and thereby hold the blocks J and K against their respective bearing surfaces. The bellows-like structure is inserted in the line of shaft, for instance of a screw propeller shaft, by means of the flanges R and S which are securely bolted to the shaft.

When the thrust or pull of the shaft causes the flexible plates to bend or yield the device as a whole is axially deformed, *i. e.*, slightly collapsed or extended and blocks J and K follows the surfaces *a* and *b* against which they slide, consequently the hand O will be moved over the scale U. The device is directly loaded to properly calibrate the scale before being connected up for use. The bodily movement of the shaft in one direction or in the other, which always takes place when driven, due to slight axial movement in the bearings does not affect the reading as both levers G and H will be moved in the same direction to the same extent.

I claim:—

1. In an instrument of the class described, an axially deformable element adapted to be coaxially connected to a shaft to rotate in unison therewith and means operated by extension and compression of said element due to axial movement of the shaft, to indicate the thrust and pull.

2. In an instrument of the class described, elastic plates connected together, adapted to be mechanically connected to a shaft and rotatable as a unit, and means operated by the axial distortion of said plates due to the axial movement of the shaft to indicate the thrust and pull.

3. In an instrument of the class described; a plurality of connected, flexible, rotatable units adapted to be mechanically connected to a shaft, and means at the opposite ends of the assembled units coöperating to indicate the axial distortion of the units upon axial movement of the shaft.

4. An instrument of the class described comprising a plurality of dished plates connected alternately to one another near their centers and edges, the end plates having suitable bearing surfaces formed thereon, an indicator, a scale for the latter and means to move the scale and indicator from the respective surfaces by the axial distortion of the assembled plates.

5. An instrument of the class described comprising a plurality of flexible units each unit composed of a pair of dished plates formed in one piece and joined together near their centers, the units bolted together at their edges, end plates having means thereon to connect them to a shaft and having bearing surfaces, a pair of levers pivoted at one end and each taking against one of said surfaces, a spring to urge the levers against their surfaces, a scale connected to one lever and an index connected to the other lever.

6. An instrument such as described, comprising a plurality of flexible dished disks connected bellows-like, levers mounted on fixed pivots and bearing at the end disks of the assembled disks, means to urge the levers against the end disks, a scale connected to one lever and an index connected to the other lever.

7. An instrument such as described comprising a plurality of flexible units, each unit comprising a pair of dished disks united near their centers, means to unite the units at their edges, end disks having means to connect the assembled disks in a shaft and having bearing surfaces thereon, a pivoted lever at each end of the end disks of the assemblage of disks, a block mounted on each lever and bearing against the adjacent bearing surface, a guide way, a scale mounted to slide thereon, and connected to one of said levers, an index hand pivoted on the scale and connected above its pivot point to the other lever and a spring connecting the scale and hand and therethrough the two levers.

In testimony that I claim the foregoing as my invention, I have signed my name in presence of two subscribing witnesses.

CARL THÄMER.

Witnesses:
 RUDOLF WEICHART,
 WILHELM KRANKENHAGEN.